US011747625B2

(12) United States Patent
Kim et al.

(10) Patent No.: US 11,747,625 B2
(45) Date of Patent: Sep. 5, 2023

(54) LIGHT COMBINER AND AUGMENTED REALITY DEVICE INCLUDING THE SAME

(71) Applicant: SAMSUNG ELECTRONICS CO., LTD., Suwon-si (KR)

(72) Inventors: Sunil Kim, Seoul (KR); Wontaek Seo, Yongin-si (KR); Geeyoung Sung, Daegu (KR); Hoon Song, Yongin-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 312 days.

(21) Appl. No.: 17/338,954

(22) Filed: Jun. 4, 2021

(65) Prior Publication Data

US 2022/0179210 A1 Jun. 9, 2022

(30) Foreign Application Priority Data

Dec. 4, 2020 (KR) ........................ 10-2020-0168729

(51) Int. Cl.
*G02B 27/01* (2006.01)

(52) U.S. Cl.
CPC .. *G02B 27/0172* (2013.01); *G02B 2027/0174* (2013.01)

(58) Field of Classification Search
CPC ................ G02B 2027/0174; G02B 2027/0178
See application file for complete search history.

(56) References Cited

U.S. PATENT DOCUMENTS

| | | | | |
|---|---|---|---|---|
| 10,345,594 | B2 | 7/2019 | Cai et al. | |
| 10,613,331 | B2 | 4/2020 | Moore et al. | |
| 2017/0176755 | A1 * | 6/2017 | Cai | G02B 27/0179 |
| 2017/0212349 | A1 | 7/2017 | Bailey et al. | |

FOREIGN PATENT DOCUMENTS

KR 1020200059906 A 5/2020

OTHER PUBLICATIONS

Kim, S.-B., et al., "Optical see-through Maxwellian near-to-eye display with an enlarged eyebox", Optics Letters, vol. 43, No. 4, Feb. 9, 2018, pp. 766-770.

* cited by examiner

*Primary Examiner* — Alexander P Gross
(74) *Attorney, Agent, or Firm* — Sughrue Mion, PLLC

(57) ABSTRACT

A light combiner combines first light provided by a light source with second light containing an image of an exterior environment and provides the combined light to a user. The light combiner includes a transmissive optical device comprising a first surface on which the first light is incident and a second surface facing the first surface, and branching the first light in a plurality of directions to pass through the second surface, and a holographic optical device on a side of the transmissive optical device facing the second surface and spaced apart from the transmissive optical device. The holographic optical device diffracts light rays branched and transmitted by the transmissive optical device in the plurality of directions, to be respectively focused at a plurality of focal points different from each other and corresponding to the directions, and transmits the second light therethrough to travel toward the plurality of focal points.

21 Claims, 9 Drawing Sheets

LIGHT COMBINER AND AUGMENTED REALITY DEVICE INCLUDING THE SAME

CROSS-REFERENCE TO RELATED APPLICATION

This application is based on and claims priority under 35 U.S.C. § 119 to Korean Patent Application No. 10-2020-0168729, filed on Dec. 4, 2020, in the Korean Intellectual Property Office, the disclosure of which is incorporated by reference herein in its entirety.

BACKGROUND

1. Field

The disclosure relates to a light combiner and an augmented reality device including the light combiner.

2. Description of the Related Art

Recently, there is an increasing demand for augmented reality (AR) glasses, which allow a user to visually recognize an artificially generated image while viewing the exterior landscape.

The AR glasses may require a light combiner that allows the user to simultaneously view an image generated by a specific signal and the exterior landscape. Examples of the light combiner include a beam splitter (BS) or a holographic optical element (HOE).

In general, an example configuration of combining the BS with an optical system including a lens and a mirror is widely used as the light combiner. However, when using this type of light combiner, the viewing angle increases, and thus, the volume of the BS and the optical system may increase.

Recently, research into using an HOE capable of implementing complex optical characteristics in a simpler form, as a light combiner, is in progress.

A light combiner using an HOE is manufactured to perform the function of a concave mirror, thereby implementing a Maxwellian view method. In other words, the HOE creates an image at a focal point that is formed at the position of the pupil of the eye. In this case, because an accurate image can be viewed only when the eye is accurately positioned at a focal point having a very small size, an eye box, which is a range of viewing an image, may be very narrow.

SUMMARY

According to various embodiments of the disclosure, provided is a light combiner capable of focusing light at a plurality of focal points and an augmented reality device capable of increasing an eye box by using the light combiner.

Additional aspects will be set forth in part in the description which follows and, in part, will be apparent from the description, or may be learned by practice of embodiments of the disclosure.

In accordance with an aspect of the disclosure, a light combiner for combining a first light provided from a light source with a second light containing an image of an exterior environment and providing the combined light to a user includes a transmissive optical device comprising a first surface on which the first light is incident and a second surface facing the first surface, the transmissive optical device branching the first light in a plurality of directions to pass through the second surface; and a holographic optical device provided on a side of the transmissive optical device facing the second surface and spaced apart from the transmissive optical device, wherein the holographic optical device diffracts a plurality of light rays that have been branched in the plurality of directions and transmitted by the transmissive optical device, to be respectively focused at a plurality of focal points different from each other and corresponding to the plurality of directions, and wherein the holographic optical device transmits the second light therethrough so as to travel toward the plurality of focal points.

The holographic optical device may include an interference pattern that diffracts a first incident light emanating from a first reference point, to be focused at a first focal point, the first reference point being fixedly located outside the holographic optical device.

The holographic optical device may diffract a second incident light emanating from a second reference point that is different from the first reference point, to be focused at a second focal point that is different from the first focal point, and a diffraction efficiency of the holographic optical device with respect to the second incident light may be less than a diffraction efficiency of the holographic optical device with respect to the first incident light.

The transmissive optical device may include a transmissive diffractive optical element that diffracts the first light such that it is branched in the plurality of directions.

The transmissive optical device may branch the first light into the plurality of light rays, and a first portion of the plurality of light rays may correspond to the first incident light and a second portion of the plurality of light rays may correspond to the second incident light.

The transmissive optical device may branch the first light such that a difference $\Delta\theta$ between a respective incident angle of each of the plurality of light rays upon the holographic optical device and an incident angle of the first incident light upon the holographic optical device is within a range of $-2° \leq \Delta\theta \leq 2°$.

The transmissive optical device may branch the first light in the plurality of directions with a same intensity of light in each direction of the plurality of directions.

The holographic optical device may focus the plurality of light rays branched in the plurality of directions and transmitted by the transmissive optical device respectively at the plurality of focal points different from each other, the plurality of focal points may be located on a side of the transmissive optical device facing the first surface of the transmissive optical device, and the holographic optical device may transmit the second light to travel toward the plurality of focal points.

The light combiner may further include a spacer that is provided between the transmissive optical device and the holographic optical device to separate the transmissive optical device from the holographic optical device.

The spacer may include a transparent substrate that covers the second surface of the transmissive optical device.

The spacer may include a column that is provided at an edge of the second surface of the transmissive optical device.

An empty space may be formed between the transmissive optical device, the holographic optical device, and the spacer.

The transmissive optical device may branch the first light such that points of incidence of the plurality of light rays on the holographic optical device form a two-dimensional pattern.

In accordance with an aspect of the disclosure, an augmented reality device includes a light source; a spatial light modulator that modulates a first light from the light source; and a light combiner that combines the first light modulated by the spatial light modulator with a second light containing an image of an exterior environment and provides the combined light to a user, wherein the light combiner includes a transmissive optical device including a first surface on which the first light is incident and a second surface facing the first surface, the transmissive optical device branching the first light in a plurality of directions to pass through the second surface; and a holographic optical device provided on a side of the transmissive optical device facing the second surface and spaced apart from the transmissive optical device, wherein the holographic optical device diffracts a plurality of light rays that have been branched in the plurality of directions and transmitted by the transmissive optical device, to be respectively focused at a plurality of focal points different from each other and corresponding to the plurality of directions, and wherein the holographic optical device transmits the second light therethrough to travel toward the plurality of focal points.

The light combiner may further include a spacer that is provided between the transmissive optical device and the holographic optical device to separate the transmissive optical device from the holographic optical device.

The augmented reality device may further include a processor that controls an operation of the spatial light modulator.

The holographic optical device may include an interference pattern that diffracts a first incident light emanating from a first reference point, to be focused at a first focal point.

The interference pattern may diffract a second incident light emanating from a second reference point that is different from the first reference point, to be focused at a second focal point that is different from the first focal point, and a diffraction efficiency of the holographic optical device with respect to the second incident light may be less than a diffraction efficiency of the holographic optical device with respect to the first incident light.

The transmissive optical device may include a transmissive diffractive optical element that diffracts the first light such that it is branched in the plurality of directions.

The transmissive optical device may branch the first light into the plurality of light rays, and a first portion of the plurality of light rays may correspond to the first incident light and a second portion of the plurality of light rays may correspond to the second incident light.

The augmented reality device may include a wearable device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
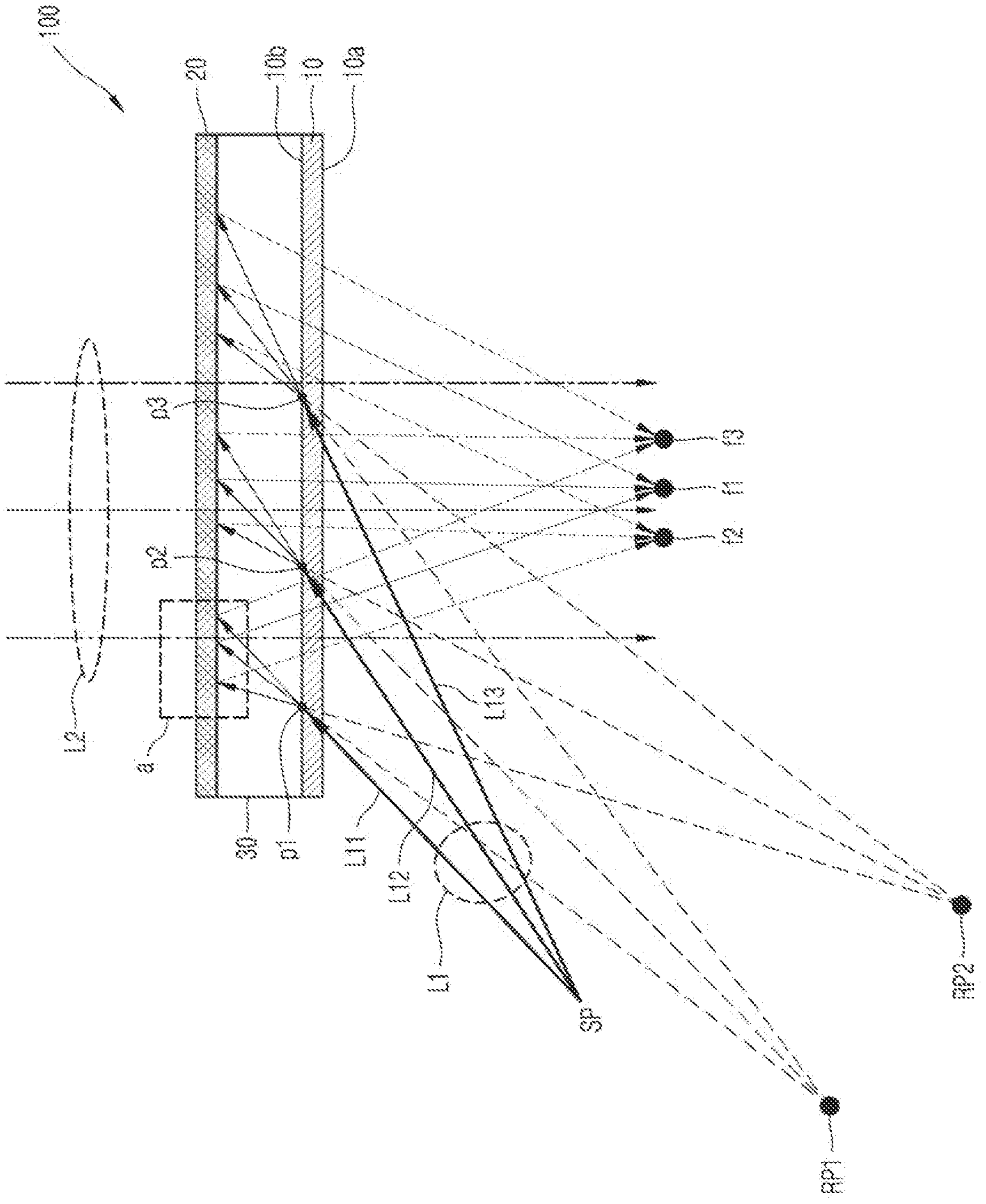
FIG. 1 is a schematic side cross-sectional view of an example configuration of a light combiner according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Throughout the drawings, the thickness or size of each layer illustrated in the drawings may be exaggerated for convenience of explanation and clarity.

When a constituent element is disposed "above" or "on" another constituent element, the constituent element may be only directly on the other constituent element or above the other constituent element in a non-contact manner. An expression used in the singular encompasses the expression of the plural, unless it has a clearly different meaning in the context. It will be further understood that the terms "comprises" and/or "comprising" used herein specify the presence of stated features or components, but do not preclude the presence or addition of one or more other features or components.

The use of the terms "a" and "an" and "the" and similar referents in the context of describing the disclosure are to be construed to cover both the singular and the plural.

Terms such as "first" and "second" are used herein merely to describe a variety of constituent elements, but the constituent elements are not limited by the terms. Such terms are used only for the purpose of distinguishing one constituent element from another constituent element.

Figure 2:
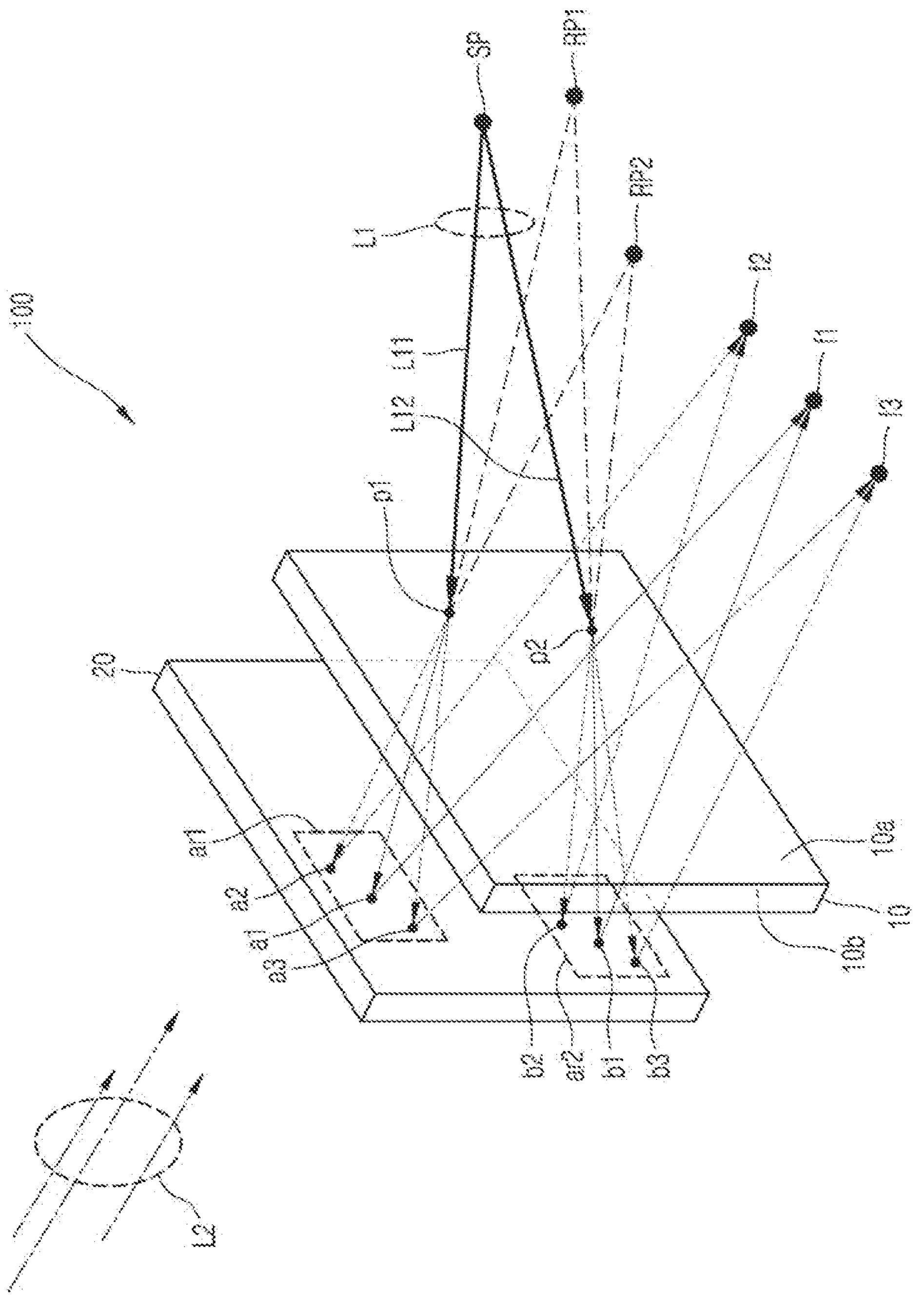
FIG. 2 is a schematic perspective view of an example configuration of the light combiner according to an embodiment.
Figure 3:
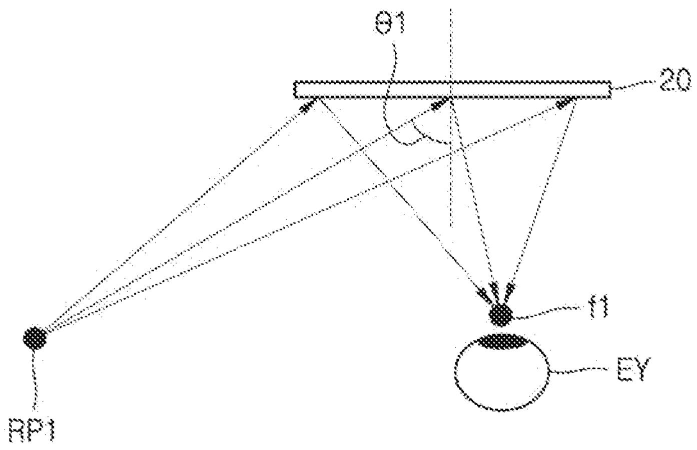
FIG. 3 is a view for explaining the function of a holographic optical device of FIG. 1.
Figure 4:
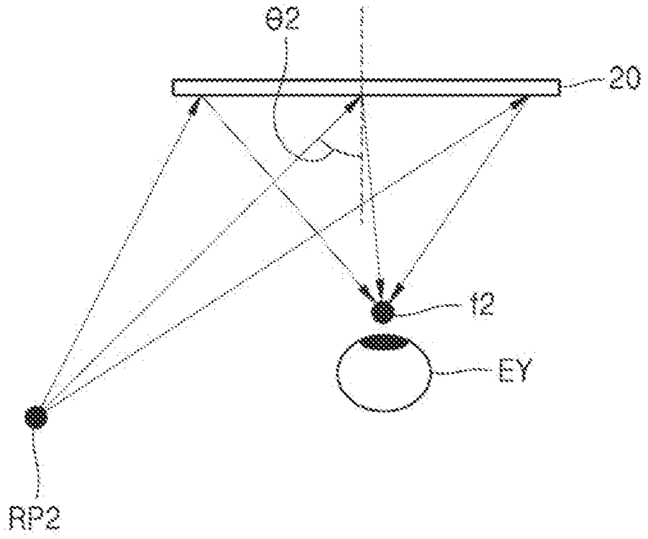
FIG. 4 is a view for explaining the function of the holographic optical device of FIG. 1.
Figure 5:
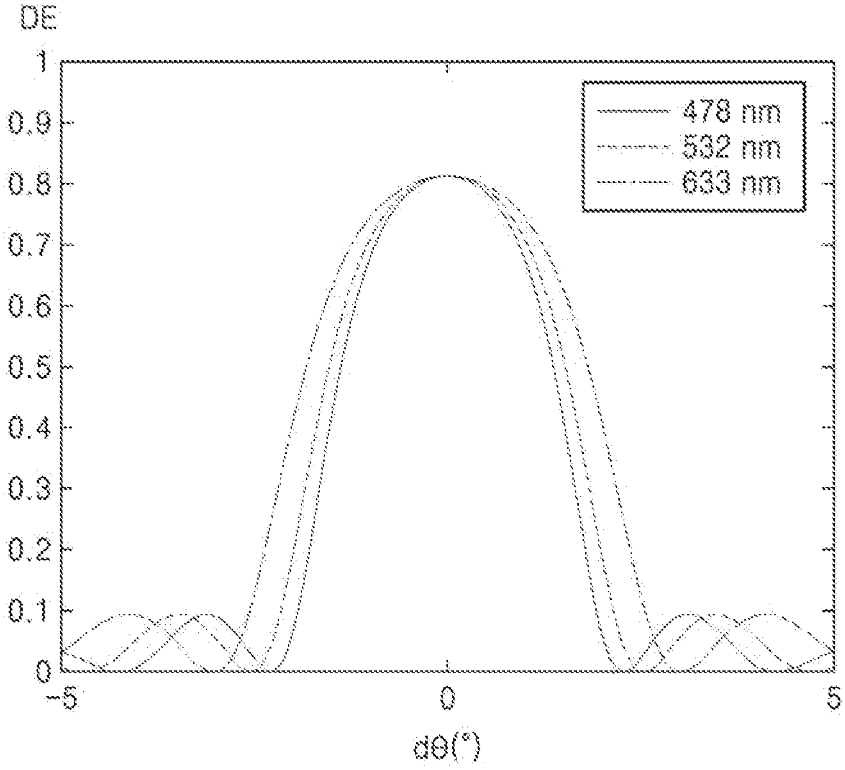
FIG. 5 is a graph of a diffraction efficiency according to an incident angle of incident light with respect to the incident light of the holographic optical device of FIG. 1.
Figure 6:
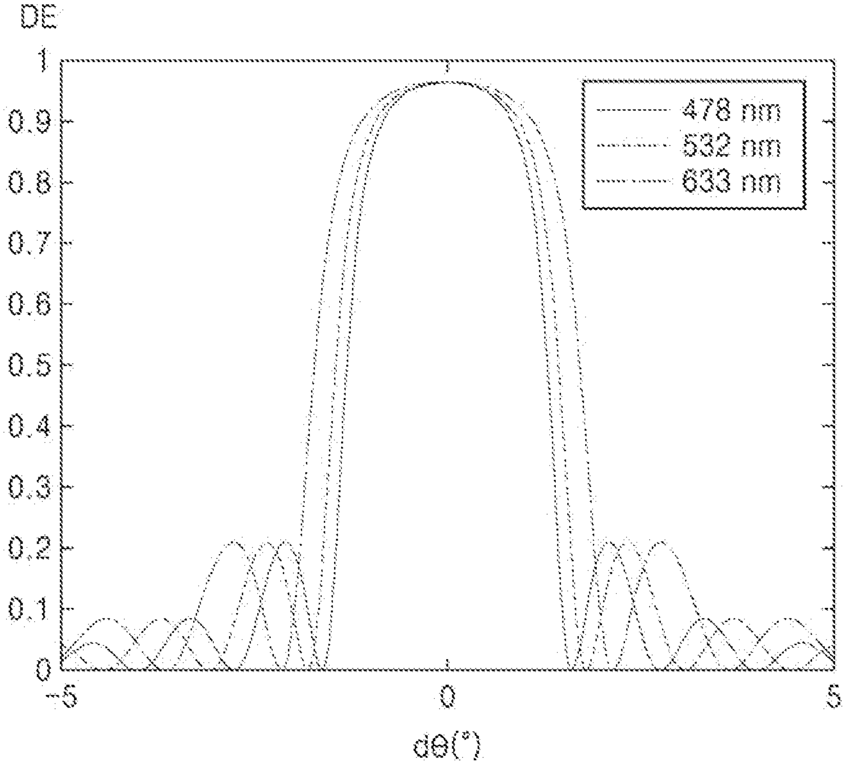
FIG. 6 is a graph of a diffraction efficiency according to an incident angle of incident light with respect to the incident light of the holographic optical device of FIG. 1.
Figure 7:
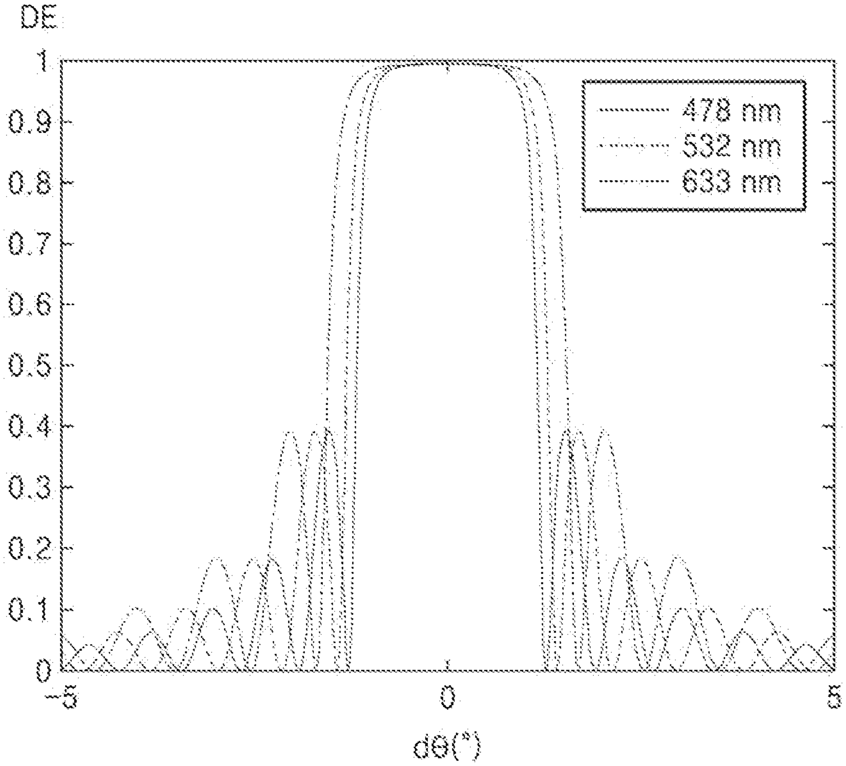
FIG. 7 is a graph of a diffraction efficiency according to an incident angle of incident light with respect to the incident light of the holographic optical device of FIG. 1.
Figure 8:
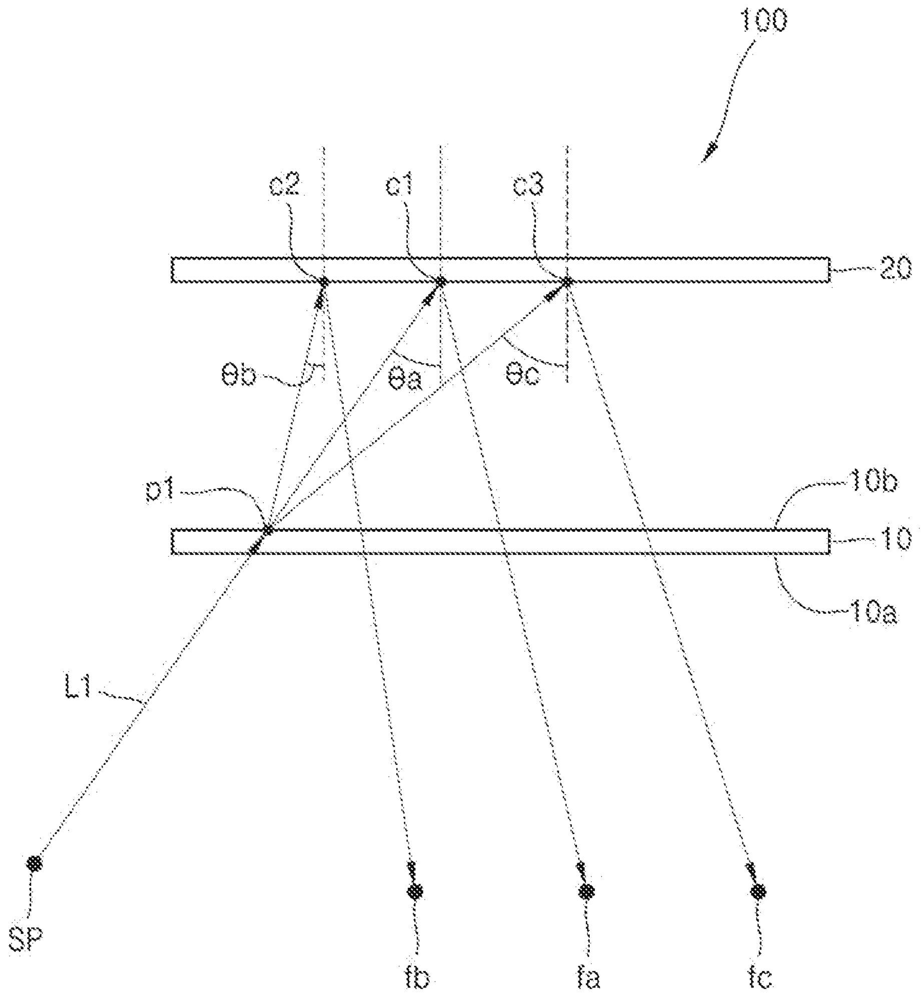
FIG. 8 is an enlarged view of an incident area (a) of FIG. 1.

FIG. 1 is a schematic side cross-sectional view of an example configuration of a light combiner 100 according to an embodiment. FIG. 2 is a schematic perspective view of an example configuration of the light combiner 100 according to an embodiment. FIGS. 3 and 4 are views for explaining the function of a holographic optical device 20 of FIG. 1. FIGS. 5 to 7 are graphs of a diffraction efficiency according to an incident angle of incident light with respect to the incident light of the holographic optical device 20 of FIG. 1. FIG. 8 is an enlarged view of an incident area (a) of FIG. 1.

Referring to FIGS. 1 and 2, the light combiner 100 may combine first light L1 provided from a light source with second light L2 containing an image of an exterior environment and provide combined light to a user. The light source may be located at a start point SP, and the first light L1 may be emitted from the start point SP to be incident on the light combiner 100. The light combiner 100 may include a transmissive optical device 10 and a holographic optical device 20. The transmissive optical device 10 may include a first surface 10*a* on which the first light L1 is incident and a second surface 10*b* facing the first surface 10*a*. Furthermore, the transmissive optical device 10 may branch the first light L1 in a plurality of directions to be emitted through the second surface 10*b*. The holographic optical device 20 may be provided on a side of the transmissive optical device 10 facing the second surface 10*b* to be spaced apart from the transmissive optical device 10. Furthermore, the holographic optical device 20 may diffract a plurality of light rays that have been emitted by being branched in a plurality of directions by the transmissive optical device 10, to be focused at each of a plurality of focal points f1, f2, and f3 different from one another and corresponding to the plurality of directions. Simultaneously, the holographic optical device 20 may transmit the second light L2 so as to travel toward the first, second, and third focal points f1, f2, and f3. In this case, the first, second, and third focal points f1, f2, and f3 different from one another may be located on a side of the transmissive optical device 10 facing the first surface 10*a* of the transmissive optical device 10.

However, the disclosure is not limited thereto, and the first, second, and third focal points f1, f2, and f3 different from one another may be located in a direction away from the holographic optical device 20 and the second surface 10*b*. In this case, the holographic optical device 20 may transmit the second light L2 incident on the first surface 10*a* so as to travel toward a side of the first, second, and third focal points f1, f2, and f3. In the following description, a case in which the first, second, and third focal points f1, f2, and f3 different from one another are located on a side of the transmissive optical device 10 facing the first surface 10*a* of the transmissive optical device 10 is described.

Referring back to FIGS. 1 and 2, the first light L1 diffracted by the holographic optical device 20 and the second light L2 transmitted through the holographic optical device 20 may travel in the same direction and may be provided to a user. Accordingly, the user may perceive a state in which an image provided by the first light L1 and an image of the exterior environment provided by the second light L2 are combined with each other.

The light combiner 100 may further include a spacer 30 that is provided between the transmissive optical device 10 and the holographic optical device 20 and separates the transmissive optical device 10 from the holographic optical device 20. The spacer 30 may include a transparent substrate that covers the second surface 10*b* of the transmissive optical device 10. Simultaneously, the spacer 30 may cover a surface of the holographic optical device 20 facing the second surface 10*b* of the transmissive optical device 10. Accordingly, a space between the transmissive optical device 10 and the holographic optical device 20 may be filled with the spacer 30 in the form of a transparent substrate. For example, the transparent substrate may include $SiO_2$. However, the disclosure is not limited thereto, and the spacer 30 may include a transparent substrate including various materials other than $SiO_2$.

The transmissive optical device 10 may include a transmissive diffractive optical element (TDOE) that diffracts and branches the first light L1 in a plurality of directions. The directions in which the first light L1 is branched may be determined according to a design of the transmissive optical device 10. For example, the transmissive optical device 10 may be designed such that the first light L1 is −1st-order, 0th-order, and +1st-order diffracted by the transmissive optical device 10 to be branched in three directions. However, the disclosure is not limited thereto, and the transmissive optical device 10 may be designed such that the first light L1 is branched by the transmissive optical device 10 in more than three directions.

The holographic optical device 20 may include an interference pattern that diffracts first incident light emanating from a first reference point RP1, to be focused at a first focal point f1, the first reference point RP1 being fixedly located outside the holographic optical device 20. The first incident light may be a first portion of the plurality of light rays diffracted by the transmissive optical device 10.

The holographic optical device 20 may be manufactured by forming, on a photosensitive film, an interference pattern due to an interference between reference light and signal light. For example, when the reference light emanating from the first reference point RP1 and the signal light emanating from the first focal point f1 are incident on the photosensitive film, an interference pattern by interference between the reference light and the signal light may be recorded on the photosensitive film. The reference light and the signal light used to manufacture the holographic optical device 20 may have the same amplitude, phase, and wavelength spectrum.

When the light emanating from the first reference point RP1 to be incident on holographic optical device 20 is irradiated onto the holographic optical device 20 that is formed in the above method, the interference pattern is reproduced, and the light incident on the holographic optical device 20 may be focused at the first focal point f1. As such, the holographic optical device 20 may have angle selectivity with respect to an incident beam. For example, when light is incident on the holographic optical device 20 in the same path as the reference light used for manufacturing the holographic optical device 20, the interference pattern is reproduced, and the incident light may travel in the same path as the signal light after being diffracted by the holographic optical device 20.

The angle selectivity of the holographic optical device 20 may have a certain allowable range. For example, even when the incident light on the holographic optical device 20 is not input in the completely same path as the reference light, the interference pattern of the holographic optical device 20 may still be reproduced. In this case, the incident light diffracted by the holographic optical device 20 may not travel in completely the same path as the signal light. The angle selectivity of the holographic optical device 20 is described below with reference to FIGS. 3 to 7.

As illustrated in FIG. 3, the first incident light irradiated from the first reference point RP1 may be incident on the holographic optical device 20 with a first incident angle 81. In this case, the first incident light emanating from the first reference point RP1 may include a plurality of light rays. As the light rays emanate from the same first reference point RP1, the incident angles of the light rays to the holographic optical device 20 may be all different. For convenience of explanation, incident angles of a plurality of light rays included in the first incident light emanating from the first reference point RP1 with respect to the holographic optical device 20 are referred to as the first incident angle 61.

When the first incident light is incident on the holographic optical device 20 at the first incident angle 61, the interference pattern included in the holographic optical device 20 is reproduced, and accordingly, the first incident light may be diffracted to be focused at the first focal point f1. As illustrated in FIG. 4, the holographic optical device 20 may diffract second incident light emanating from a second reference point RP2 that is different from the first reference point RP1 to be incident on the holographic optical device 20, to be focused at a second focal point f2 that is different from the first focal point f1. The second incident light may be a second portion of the plurality of light rays diffracted by the transmissive optical device 10. As such, as the holographic optical device 20 has an angle selectivity having a certain allowable range, even when the second incident light emanating from the second reference point RP2 that is different from the first reference point RP1 and traveling in a path different from the first incident light is incident on the holographic optical device 20, the interference pattern included in the holographic optical device 20 may still be reproduced. Accordingly, the second incident light may be diffracted by the holographic optical device 20 to be focused at the second focal point f2.

However, diffraction efficiencies of the first incident light and the second incident light of the holographic optical device 20 may be different from each other. For example, the diffraction efficiency of the interference pattern included in the holographic optical device 20 with respect to the second incident light may be lower than the diffraction efficiency thereof with respect to the first incident light. Simultaneously, the diffraction efficiency of the interference pattern included in the holographic optical device 20 with respect to the second incident light may be about 50% lower than the diffraction efficiency thereof with respect to the first incident light. Accordingly, the intensity of the second incident light focused at the second focal point f2 may be less than the intensity of the first incident light focused at the first focal point f1. However, the disclosure is not limited thereto, and the diffraction efficiency of the interference pattern included in the holographic optical device 20 with respect to the second incident light may be less than about 50% and greater than about 20% than the diffraction efficiency thereof with respect to the first incident light.

As the first incident light travels in the same path as the reference light that is used when the interference pattern included in the holographic optical device 20 is formed, the diffraction efficiency of the holographic optical device 20 with respect to the first incident light may be maximum. However, as the second incident light is incident in a path different from that of the reference light, the diffraction efficiency of the holographic optical device 20 with respect to the second incident light is less than the diffraction efficiency thereof with respect to the first incident light.

Referring to FIGS. 5 to 7, it may be seen that a diffraction efficiency of the holographic optical device 20 with respect to the incident light varies according to a difference dθ between the incident angle of the incident light and the incident angle of the reference light with respect to the holographic optical device 20. In the graphs of FIGS. 5 to 7, the horizontal axis denotes the difference dθ between the incident angle of the incident light and the incident angle of the reference light, and the vertical axis denotes the diffraction efficiency DE of the holographic optical device 20 with respect to the incident light.

FIG. 5 shows a change in the diffraction efficiency according to the incident angle of incident light with respect to the incident light of the holographic optical device 20 when the holographic optical device 20 has a thickness of about 10 μm and includes an interference pattern formed by the reference light having an incident angle of about 60°. FIG. 6 shows a change in the diffraction efficiency according to the incident angle of incident light with respect to the incident light of the holographic optical device 20 when the holographic optical device 20 has a thickness of about 16 μm and includes an interference pattern formed by the reference light having an incident angle of about 60°. FIG. 7 shows a change in the diffraction efficiency according to the incident angle of incident light with respect to the incident light of the holographic optical device 20 when the holographic optical device 20 has a thickness of about 25 μm and includes an interference pattern formed by the reference light having an incident angle of about 60°. FIGS. 5 to 7 show results of the incident light having wavelengths of about 478 nm, about 532 nm, and about 633 nm.

Referring to FIGS. 5 to 7, when the difference dθ in the incident angle between the incident light and the reference light is a specific angle or greater, the diffraction efficiency DE of the holographic optical device 20 with respect to the incident light may be sharply reduced. For example, referring to FIG. 6, the holographic optical device 20 having a thickness of about 16 μm may have a relatively high diffraction efficiency DE when the difference dθ in the incident angle between the incident light and the reference light is within a range of $-2° \le d\theta \le 2°$. Unlike the above, when the difference dθ in the incident angle between the incident light and the reference light is out of the range of $-2° \le d\theta \le 2°$, the diffraction efficiency DE of the holographic optical device 20 with respect to the incident light may be sharply reduced. As such, a section to which the difference dθ in the incident angle between the incident light and the reference light belongs directly before the diffraction efficiency DE of the holographic optical device 20 with respect to the incident light is sharply reduced may be referred to as an allowable range of angle selectivity. The allowable range of angle selectivity may vary according to the thickness, the interference pattern, and the like of the holographic optical device 20.

For example, referring to FIGS. 5 to 7, as the thickness of the holographic optical device 20 increases, the maximum value of the diffraction efficiency DE of the holographic optical device 20 with respect to the incident light may increase, and the allowable range of angle selectivity may decrease. In contrast, as the thickness of the holographic optical device 20 decreases, the maximum value of the diffraction efficiency DE of the holographic optical device 20 with respect to the incident light may decrease, and the allowable range of angle selectivity may increase.

Referring back to FIG. 1, the transmissive optical device 10 may diffract the first light L1 to be branched in a plurality of directions, the first light L1 including a plurality of light rays, that is, first, second, and third light rays L11, L12, and L13, that emanate from the start point SP to be incident on the transmissive optical device 10. For example, the transmissive optical device 10 may branch the first light L1 in a plurality of directions at each of a plurality of points, that is, first, second, and third points p1, p2, and p3. Although FIG. 1 illustrates three points p1, p2, and p3, this is merely for convenience of explanation, and countless points may be included in the entire area on which the first light L1 is incident. The following descriptions of the first, second, and third points p1, p2, and p3 may be identically applied to the countless points included in the entire area on which the first light L1 is incident.

The diffraction of the first light L1 may occur at each of the first, second, and third points p1, p2, and p3 included in the transmissive optical device 10. For example, −1st-order, 0th-order, and +1st-order diffractions with respect to the first light L1 may occur at each of the first, second, and third points p1, p2, and p3, respectively. A −1st-order diffracted light ray, a 0th-order diffracted light ray, and a +1st-order diffracted light ray of the first light L1 may each travel in directions different from one another. For example, each of the −1st-order diffracted light ray, the 0th-order diffracted light ray, and the +1st-order diffracted light ray, which are generated as the first light ray L11 is diffracted at the first point p1, may be incident in the incident area (a) of the holographic optical device 20.

The light rays branched in directions different from one another at each of the first, second, and third points p1, p2, and p3 of the transmissive optical device 10 may then be incident on the holographic optical device 20. The holographic optical device 20 may diffract the incident light rays that are branched in a plurality of directions by the transmissive optical device 10, to focus at the first, second, and third focal points f1, f2, and f3 different from one another respectively corresponding to the directions. For example, as shown in FIG. 1, the holographic optical device 20 may diffract 0th-order diffracted light rays by the transmissive optical device 10 to be focused at the first focal point f1. Furthermore, the holographic optical device 20 may diffract −1st-order diffracted light rays by the transmissive optical device 10 to be focused at the second focal point f2. Furthermore, the holographic optical device 20 may diffract +1st-order diffracted light rays by the transmissive optical device 10 to be focused at the third focal point f3.

Referring to FIG. 2, diffraction with respect to the first light ray L11 and the second light ray L12 included in the first light L1 may occur at the first point p1 and the second point p2, respectively, of the transmissive optical device 10. For example, −1st-order, 0th-order, and +1st-order diffractions may occur at the first point p1 with respect to the first light ray L11. Furthermore, −1st-order, 0th-order, and +1st-order diffractions may occur at the second point p2 with respect to the second light ray L12. In FIG. 2, for convenience of explanation, the third point p3 is omitted.

The light rays diffracted and branched at the first point p1 may be incident on a first incident area ar1 of the holographic optical device 20. For example, the light that is 0th-order diffracted at the first point p1 may be incident at a first incident point a1 in the first incident area ar1. Furthermore, the light that is −1st-order diffracted at the first point p1 may be incident at a second incident point a2 in the first incident area ar1. Furthermore, the light that is +1st-order diffracted at the first point p1 may be incident at a third incident point a3 in the first incident area ar1.

Similarly, the light rays diffracted and branched at the second point p2 may be incident in a second incident area ar2 of the holographic optical device 20. For example, the light that is 0th-order diffracted at the second point p2 may be incident at a first incident point b1 in the second incident area ar2. Furthermore, the light that is −1st-order diffracted at the second point p2 may be incident at a second incident point b2 in the second incident area ar2. Furthermore, the light that is +1st-order diffracted at the second point p2 may be incident at a third incident point b3 in the second incident area ar2.

The 0th-order diffracted light rays that are incident at the first incident point a1 of the first incident area ar1 and the first incident point b1 of the second incident area ar2 may be focused at the first focal point f1 by the interference pattern included in the holographic optical device 20. Furthermore, the −1st-order diffracted light rays that are incident at the second incident point a2 of the first incident area ar1 and the second incident point b2 of the second incident area ar2 may be focused at the second focal point f2 by the interference pattern included in the holographic optical device 20. Furthermore, the +1st-order diffracted light rays that are incident at the third incident point a3 of the first incident area ar1 and the third incident point b3 of the second incident area ar2 may be focused at the third focal point f3 by the interference pattern included in the holographic optical device 20.

In this case, extension lines of traveling paths of the 0th-order diffracted light rays by the transmissive optical device 10 may meet at the first reference point RP1. For example, the traveling paths of the 0th-order diffracted light rays may be the same as the traveling path of light emanating from the first reference point RP1 to be incident on the holographic optical device 20. In other words, the 0th-order diffracted light rays may correspond to the first incident light of FIG. 3. The traveling path of the light emanating from the first reference point RP1 is the same as the reference light used to form the interference pattern formed on the holographic optical device 20. Accordingly, the traveling path of 0th-order diffracted light rays may be the same as the traveling path of the reference light. Accordingly, the diffraction efficiency of the holographic optical device 20 with respect to the 0th-order diffracted light rays may be the maximum.

Unlike the above, extension lines of traveling paths of the −1st-order diffracted light rays by the transmissive optical device 10 may meet at the second reference point RP2. For example, the traveling paths of the −1st-order diffracted light rays may be the same as the traveling path of the light emanating from the second reference point RP2 to be incident on the holographic optical device 20. In other words, the −1st-order diffracted light rays may correspond to the second incident light of FIG. 4. Accordingly, the traveling paths of the −1st-order diffracted light rays may be different from the traveling path of the reference light. Accordingly, the diffraction efficiency of the holographic optical device 20 with respect to the −1st-order diffracted light rays may be less than the diffraction efficiency thereof with respect to the 0th-order diffracted light rays.

Referring to FIG. 8, the transmissive optical device 10 may branch the first light L1 such that a difference $\Delta\theta$ in the incident angles of the light rays that are branched in a plurality of directions at a certain point of the transmissive optical device 10 with respect to the holographic optical device 20 is $-2°\leq\Delta\theta\leq2°$. In other words, the incident angles of the branched light rays may have a difference $\Delta\theta$ from an incident angle of the first incident light within a range of $-2°\leq\Delta\theta\leq2°$.

For example, as shown in FIG. 8, among the light branched at the first point p1 of the transmissive optical device 10, an incident angle of the 0th-order diffracted light ray with respect to a first incident point c1 of the holographic optical device 20 may be referred to as a first incident angle $\theta_a$. The 0th-order diffracted light ray may be light that is incident on the holographic optical device 20 in the same path as the reference light used to form the holographic optical device 20. Furthermore, among the light branched at the first point p1 of the transmissive optical device 10, an incident angle of the −1st-order diffracted light ray with respect to a second incident point c2 of the holographic optical device 20 may be referred to as a second incident angle $\theta_b$. Furthermore, among the light branched at the first point p1 of the transmissive optical device 10, an incident angle of the +1st-order diffracted light ray with respect to a third incident point c3 of the holographic optical device 20 may be referred to as a third incident angle $\theta_c$.

In this case, the first incident angle $\theta_a$, the second incident angle $\theta_b$, and the third incident angle $\theta_c$ may be included in an allowable range of the angle selectivity of the holographic optical device 20. In other words, the interference pattern of the holographic optical device 20 may be reproduced by the light rays incident on the first incident angle $\theta_a$, the second incident angle $\theta_b$, and the third incident angle $\theta_c$. To include the first incident angle $\theta_a$, the second incident angle $\theta_b$, and the third incident angle $\theta_c$ in the allowable range of the angle selectivity of the holographic optical device 20, a difference $\Delta\theta$ among the first incident angle $\theta_a$, the second incident angle $\theta_b$, and the third incident angle $\theta_c$ may satisfy a condition that $-2° \le \Delta\theta \le 2°$. However, the disclosure is not limited thereto, and the allowable range of the angle selectivity of the holographic optical device 20 may vary according to the thickness, the interference pattern, and the like of the holographic optical device 20.

The transmissive optical device 10 may branch the first light L1 in a plurality of directions with the same intensity of light in each direction. For example, the intensities of the −1st-order diffracted light ray, the 0th-order diffracted light ray, and the +1st-order diffracted light rays that are respectively generated as the first light L1 is diffracted at the first, second, and third points p1, p2, and p3 of the transmissive optical device 10 may all be the same.

Figure 9:
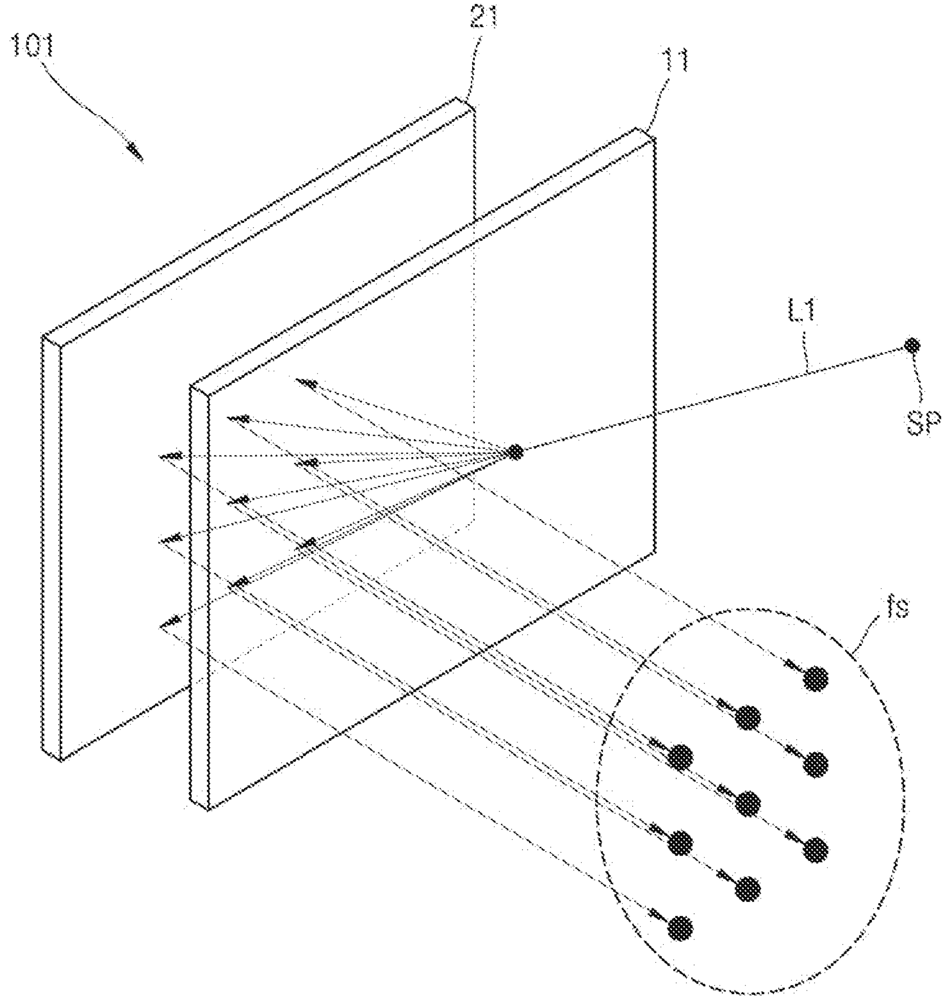
FIG. 9 is a schematic perspective view of an example configuration of a light combiner according to an embodiment.

FIG. 9 is a schematic perspective view of an example configuration of a light combiner 101 according to an embodiment. The light combiner 101 of FIG. 9 is substantially the same as the light combiner 100 of FIG. 1, except that a transmissive optical device 11 branches the first light L1 in more directions than the transmissive optical device 10 of FIG. 1. In the description of FIG. 9, any redundant descriptions as previously given with reference to FIGS. 1 to 8 are omitted.

Referring to FIG. 9, the transmissive optical device 11 may branch the first light L1 that emanates from the start point SP to be incident on the transmissive optical device 11, so as to travel toward a plurality of points located on a two-dimensional plane. In other words, the points of incidence of the branched light rays on the holographic optical device 21 may form a two-dimensional pattern. For example, as illustrated in FIG. 9, a plurality of diffracted light rays that are formed as the first light L1 is diffracted and branched by the transmissive optical device 11 may travel toward nine points located on a plane of a holographic optical device 21. The number of points, that is, the nine points, is an example, and the first light L1 may be branched by the transmissive optical device 11 in more than nine directions.

As such, the light rays that are formed as the first light L1 is branched by the transmissive optical device 11 so as to travel toward a plurality of points located on the two-dimensional plane may be diffracted by the holographic optical device 21 to be focused respectively at a plurality of focal points fs different from each other and provided outside the light combiner 101.

Figure 10:
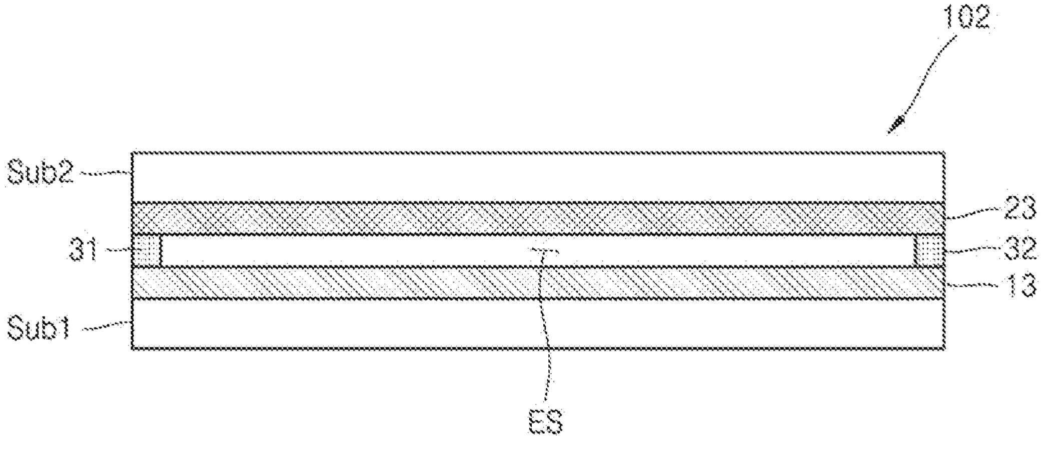
FIG. 10 is a schematic cross-sectional view of an example configuration of a light combiner according to an embodiment.

FIG. 10 is a schematic cross-sectional view of an example configuration of a light combiner 102 according to an embodiment. The light combiner 102 of FIG. 10 may be substantially the same as the light combiner 100 of FIG. 1, except that the structures of spacers 31 and 32 are different from the structure of the spacer 30 of FIG. 1, and the light combiner 102 further includes substrates Sub1 and Sub2. In the description of FIG. 10, any redundant descriptions as previously given with reference to FIGS. 1 to 8 are omitted from the description with reference to FIG. 10.

Referring to FIG. 10, the light combiner 102 may include the spacers 31 and 32 between a transmissive optical device 13 and a holographic optical device 23 to separate the transmissive optical device 13 from the holographic optical device 23. The spacers 31 and 32 may include a column provided at an edge of a second surface of the transmissive optical device 13. For example, the spacers 31 and 32 may include a first column and a second column that are separated from each other to support the transmissive optical device 13 and the holographic optical device 23 therebetween. In this case, an empty space ES may be formed between the transmissive optical device 13, the holographic optical device 23, and the spacers 31 and 32.

Figure 11:
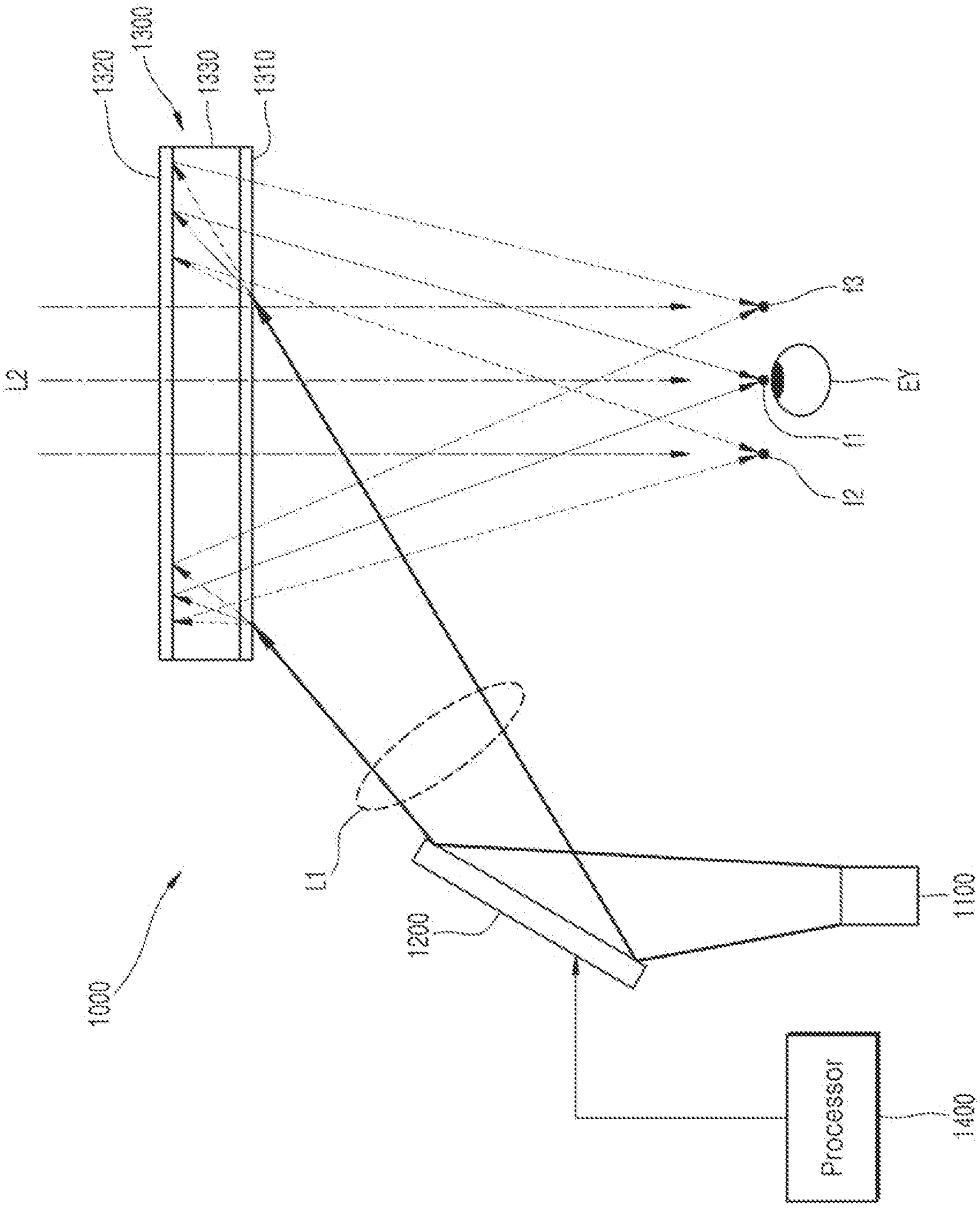
FIG. 11 is a schematic view of an example configuration of an augmented reality device according to an embodiment.

FIG. 11 is a schematic view of an example configuration of an augmented reality device 1000 according to an embodiment.

Referring to FIG. 11, the augmented reality device 1000 may include a light source 1100, a spatial light modulator 1200 for modulating the first light L1 from the light source 1100, and a light combiner 1300 for combining the first light L1 modulated by the spatial light modulator 1200 with the second light L2 containing the image of the exterior environment and providing the combined light to a user. Furthermore, the augmented reality device 1000 may further include a processor 1400 for controlling an operation of the spatial light modulator 1200.

The light source 1100 may include a laser diode that emits a laser beam. The laser beam emitted from the light source 1100 may have coherence.

The amplitude, phase, and wavelength spectrum of the first light L1 emitted from the light source 1100 are the same as those of reference light used to form an interference pattern included in a holographic optical device 1320. Accordingly, when the first light L1 emitted from the light source 1100 is incident on the holographic optical device 1320 at an appropriate angle, the interference pattern included in the holographic optical device 1320 may be reproduced.

The spatial light modulator 1200 may include, for example, an optical electrical device capable of changing a refractive index by an electrical signal. The spatial light modulator 1200 may include, for example, an optical electrical material layer such as a liquid crystal layer. When a voltage is applied to the optical electrical material layer included in the spatial light modulator 1200, a refractive index of the optical electrical material layer may be changed, and accordingly, the amplitude, phase, or wavelength of the light incident on the spatial light modulator 1200 may be modulated. For example, the spatial light modulator 1200 may include a liquid crystal on silicon (LCoS) or a digital micro mirror (DMD).

The spatial light modulator 1200 may receive an image signal from the processor 1400 and modulate at least one of the amplitude, phase and wavelength of the first light L1 emanating from the light source 1100 to be incident on the spatial light modulator 1200 according to the image signal. Accordingly, the first light L1 emitted from the light source 1100 may include an image.

The processor 1400 may include, for example, at least one hardware component among central processing units, micro-processors, graphics processing units, application specific integrated circuits (ASICs), digital signal processors (DSPs), digital signal processing devices (DSPDs), programmable logic devices (PLDs), and field programmable gate arrays (FPGAs), but the disclosure is not limited thereto.

The light combiner 1300 may include a transmissive optical device 1310, the holographic optical device 1320 and a spacer 1330 that is provided between the transmissive optical device 1310 and the holographic optical device 1320 and separates the transmissive optical device 1310 from the holographic optical device 1320. The light combiner 1300 may include any of the light combiners 100, 101, and 102 described with reference to FIGS. 1 to 10.

The transmissive optical device 1310 may branch the first light L1 in a plurality of directions with the same intensity of light in each direction. The holographic optical device 1320 may focus the light rays branched by the transmissive optical device 1310 in a plurality of directions to be focused at the first, second, and third focal points f1, f2, and f3 corresponding to the directions. The first light L1 that is modulated by the spatial light modulator 1200 and includes an image may be branched by the transmissive optical device 1310 in a plurality of directions. Accordingly, the same image included in the first light L1 may be formed at each of the first, second, and third focal points f1, f2, and f3 by the holographic optical device 1320. A user may perceive the image included in the first light L1 by locating an eye EY at any one of the first, second, and third focal points f1, f2, and f3. Furthermore, simultaneously, the second light L2 from the outside may transmit through the light combiner 1300 to be incident on the eye EY of the user at any one of the first, second, and third focal points f1, f2, and f3. Accordingly, the user may simultaneously perceive the image included in the first light L1 and the image of the exterior environment.

As such, as the same image is formed at the first, second, and third focal points f1, f2, and f3, an eye box of the augmented reality device 1000 may be enlarged.

Figure 12:
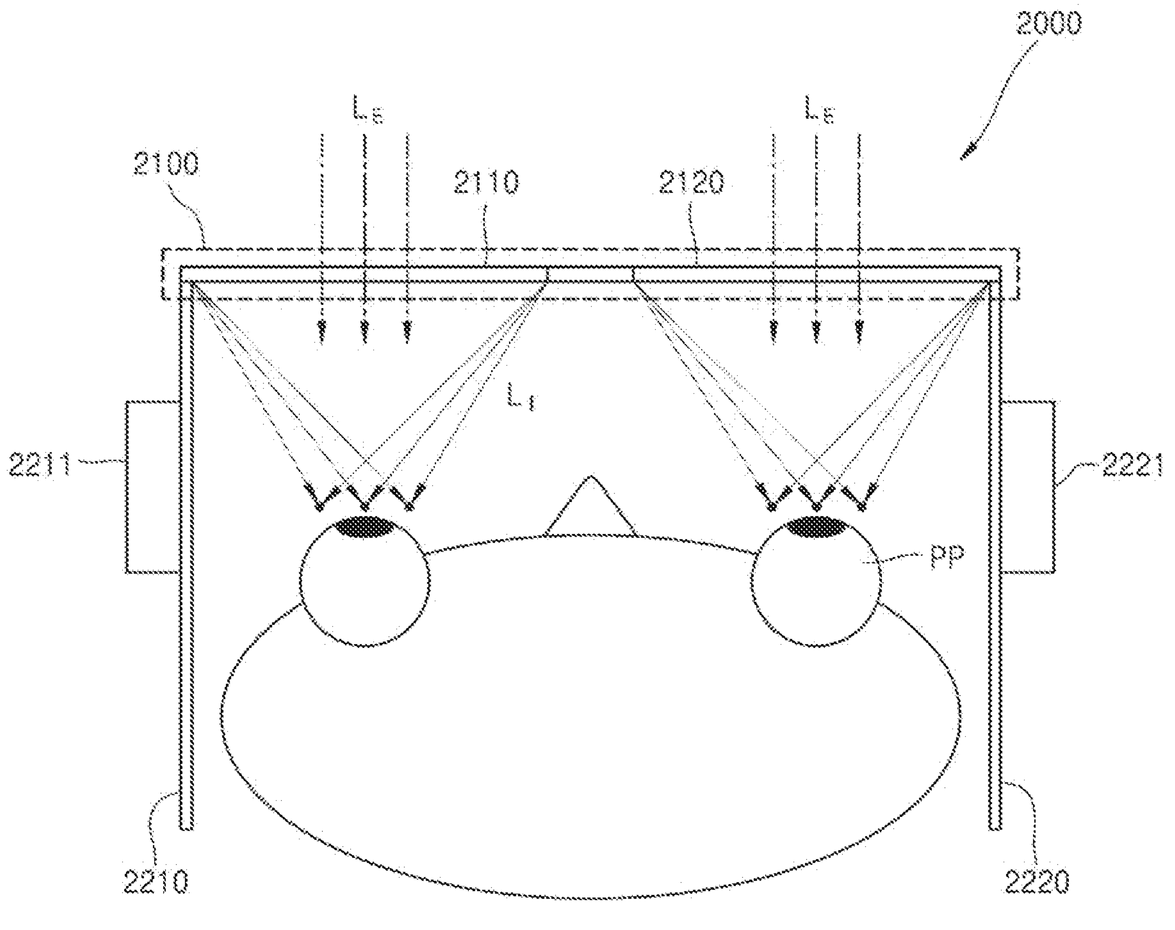
FIG. 12 is a schematic view of an example configuration of an augmented reality device according to an embodiment.

FIG. 12 is a schematic view of an example configuration of an augmented reality device 2000 according to an embodiment.

Referring to FIG. 12, the augmented reality device 2000 may include a wearable device that a user may attach to the body. For example, the augmented reality device 2000 may include augmented reality glasses. In this case, the augmented reality device 2000 may include a body 2100 and first and second leg parts 2210 and 2220. Furthermore, the augmented reality device 2000 may include first and second light combiners 2110 and 2120 that combine external light $L_E$ and internal light $L_I$, and first and second image generation apparatuses 2211 and 2221 that generate the internal light $L_I$.

The body 2100 may be at a position corresponding to the front side of an eyeball PP of a user. The first and second leg parts 2210 and 2220 may be contact members with which a user may wear the augmented reality device 2000 on the face of the user. The first and second leg parts 2210 and 2220 may be provided at positions respectively corresponding to the left and right sides of the user.

The first and second light combiners 2110 and 2120 for combining the external light $L_E$ with the internal light $L_I$ may be provided at a front side of the body 2100 facing the eyeball PP of the user. The first and second light combiners 2110 and 2120 each may include any one of the light combiners 100, 101, and 102 described with reference to FIGS. 1 to 10. The first and second light combiners 2110 and 2120 may be respectively provided at the left and right sides of the body 2100. The first light combiner 2110 and the second light combiner 2120 may be provided to face the eyeball PP of the user. The first light combiner 2110 and the second light combiner 2120 may branch the internal light $L_I$ including an image provided from the first and second image generation apparatuses 2211 and 2221 in a plurality of directions to be focused at a plurality of focal points located around the eyeball PP of the user.

The first and second leg parts 2210 and 2220 may be provided with the first and second image generation apparatuses 2211 and 2221, respectively. However, the disclosure is not limited thereto, and the first and second image generation apparatuses 2211 and 2221 may be provided on the body 2100 according to a design. The first and second image generation apparatuses 2211 and 2221 may be provided in the first leg part 2210 and the second leg part 2220, respectively. The first and second image generation apparatuses 2211 and 2221 each may include the light source 1100 and the space light modulator 1200 that are described with reference to FIG. 11. The first image generation apparatus 2211 may provide the internal light $L_I$ including the image to the first light combiner 2110. Furthermore, the second image generation apparatus 2221 may provide the internal light $L_I$ including the image to the second light combiner 2120.

As such, the external light $L_E$ input from the outside of the augmented reality device 2000 may pass through the first and second light combiners 2110 and 2120 to be provided to the eyeball PP of the user. The internal light $L_I$ may be provided to the eyeball PP of a user by being focused at a plurality of focal points located around the eyeball PP of the user. As such, the external light $L_E$ and the internal light $L_I$ may be combined with each other and provided to the user.

According to various embodiments of the disclosure, the light combiner capable of focusing light at a plurality of focal points by using a transmissive optical device capable of diffracting and branching the light in a plurality of directions, and an augmented reality device capable of increasing an eye box by using the light combiner, may be provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A light combiner for combining a first light provided from a light source with a second light containing an image of an exterior environment and providing the combined light to a user, the light combiner comprising:

a transmissive optical device comprising a first surface on which the first light is incident and a second surface facing the first surface, the transmissive optical device branching the first light in a plurality of directions to pass through the second surface; and a holographic optical device provided on a side of the transmissive optical device facing the second surface and spaced apart from the transmissive optical device, wherein the holographic optical device diffracts a plurality of light rays that have been branched in the plurality of directions and transmitted by the transmissive optical device, to be respectively focused at a plurality of focal points different from each other and corresponding to the plurality of directions, and wherein the holographic optical device transmits the second light therethrough so as to travel toward the plurality of focal points.

2. The light combiner of claim 1, wherein the holographic optical device comprises an interference pattern that diffracts a first incident light emanating from a first reference point, to be focused at a first focal point, the first reference point being fixedly located outside the holographic optical device.

3. The light combiner of claim 2, wherein the holographic optical device diffracts a second incident light emanating from a second reference point that is different from the first reference point, to be focused at a second focal point that is different from the first focal point, and a diffraction efficiency of the holographic optical device with respect to the second incident light is less than a diffraction efficiency of the holographic optical device with respect to the first incident light.

4. The light combiner of claim 3, wherein the transmissive optical device comprises a transmissive diffractive optical element that diffracts the first light such that it is branched in the plurality of directions.

5. The light combiner of claim 4, wherein the transmissive optical device branches the first light into the plurality of light rays, and wherein a first portion of the plurality of light rays corresponds to the first incident light and a second portion of the plurality of light rays corresponds to the second incident light.

6. The light combiner of claim 4, wherein the transmissive optical device branches the first light such that a difference $\Delta\theta$ between a respective incident angle of each of the plurality of light rays upon the holographic optical device and an incident angle of the first incident light upon the holographic optical device is within a range of $-2° \leq \Delta\theta \leq 2°$.

7. The light combiner of claim 1, wherein the transmissive optical device branches the first light in the plurality of directions with a same intensity of light in each direction of the plurality of directions.

8. The light combiner of claim 1, wherein the holographic optical device focuses the plurality of light rays branched in the plurality of directions and transmitted by the transmissive optical device respectively at the plurality of focal points different from each other, wherein the plurality of focal points is located on a side of the transmissive optical device facing the first surface of the transmissive optical device, and wherein the holographic optical device transmits the second light to travel toward the plurality of focal points.

9. The light combiner of claim 1, further comprising a spacer that is provided between the transmissive optical device and the holographic optical device to separate the transmissive optical device from the holographic optical device.

10. The light combiner of claim 9, wherein the spacer comprises a transparent substrate that covers the second surface of the transmissive optical device.

11. The light combiner of claim 9, wherein the spacer comprises a column that is provided at an edge of the second surface of the transmissive optical device.

12. The light combiner of claim 11, wherein an empty space is formed between the transmissive optical device, the holographic optical device, and the spacer.

13. The light combiner of claim 1, wherein the transmissive optical device branches the first light such that points of incidence of the plurality of light rays on the holographic optical device form a two-dimensional pattern.

14. An augmented reality device comprising:

a light source;

a spatial light modulator that modulates a first light from the light source; and a light combiner that combines the first light modulated by the spatial light modulator with a second light containing an image of an exterior environment and provides the combined light to a user, wherein the light combiner comprises:

a transmissive optical device comprising a first surface on which the first light is incident and a second surface facing the first surface, the transmissive optical device branching the first light in a plurality of directions to pass through the second surface; and a holographic optical device provided on a side of the transmissive optical device facing the second surface and spaced apart from the transmissive optical device, wherein the holographic optical device diffracts a plurality of light rays that have been branched in the plurality of directions and transmitted by the transmissive optical device, to be respectively focused at a plurality of focal points different from each other and corresponding to the plurality of directions, and wherein the holographic optical device transmits the second light therethrough to travel toward the plurality of focal points.

15. The augmented reality device of claim 14, wherein the light combiner further comprises a spacer that is provided between the transmissive optical device and the holographic optical device to separate the transmissive optical device from the holographic optical device.

16. The augmented reality device of claim 14, further comprising a processor that controls an operation of the spatial light modulator.

17. The augmented reality device of claim 14, wherein the holographic optical device comprises an interference pattern that diffracts a first incident light emanating from a first reference point, to be focused at a first focal point.

18. The augmented reality device of claim 17, wherein the interference pattern diffracts a second incident light emanating from a second reference point that is different from the first reference point, to be focused at a second focal point that is different from the first focal point, and a diffraction efficiency of the holographic optical device with respect to the second incident light is less than a diffraction efficiency of the holographic optical device with respect to the first incident light.

19. The augmented reality device of claim 18, wherein the transmissive optical device comprises a transmissive diffractive optical element that diffracts the first light such that it is branched in the plurality of directions.

20. The augmented reality device of claim 19, wherein the transmissive optical device branches the first light into the plurality of light rays, and wherein a first portion of the plurality of light rays corresponds to the first incident light and a second portion of the plurality of light rays corresponds to the second incident light.

21. The augmented reality device of claim 14, wherein the augmented reality device comprises a wearable device.

* * * * *